United States Patent [19]

Hirahara et al.

[11] Patent Number: 5,376,603
[45] Date of Patent: Dec. 27, 1994

[54] DIELECTRIC CERAMIC FOR MICROWAVES

[75] Inventors: Seiichiro Hirahara; Nobuyoshi Fujikawa, both of Kokubu, Japan

[73] Assignee: Kyocera Corporation, Kyoto, Japan

[21] Appl. No.: 235,138

[22] Filed: Apr. 28, 1994

Related U.S. Application Data

[63] Continuation of Ser. No. 961,125, Oct. 14, 1992, abandoned.

[30] Foreign Application Priority Data

Oct. 14, 1991 [JP] Japan .................................. 3-264771

[51] Int. Cl.$^5$ ............................................ C04B 35/46
[52] U.S. Cl. ................................... 501/134; 501/136; 501/137; 501/138
[58] Field of Search ................. 501/134, 136, 137, 138

[56] References Cited

U.S. PATENT DOCUMENTS

| | | | |
|---|---|---|---|
| 3,732,117 | 5/1973 | Nitta et al. | 501/137 |
| 4,106,075 | 8/1978 | Baumann et al. | 501/137 |
| 4,115,493 | 9/1978 | Sakabe et al. | 501/137 |
| 4,248,727 | 2/1981 | Kawashima et al. | 501/137 |
| 4,670,409 | 6/1987 | Okawa et al. | 50/135 |
| 4,699,891 | 10/1987 | Sato et al. | 501/137 |
| 4,755,493 | 7/1988 | Takeuchi et al. | 501/137 |

FOREIGN PATENT DOCUMENTS

61-128411 6/1986 Japan.
100058 5/1988 Japan.

OTHER PUBLICATIONS

"Microwave Characteristics of (Zr,Sn)TiO$_4$ and BaO—PbO—Nd$_2$O$_3$—TiO$_2$ Dielectric Resonators"; Wakino et al.; Journal of American Ceramic Society; vol. 67, No. 4, Jun., 1983.

"Ba(Zn$_{\frac{1}{3}}$Ta$_{\frac{2}{3}}$)O$_3$ Ceramics with Low Dielectric Loss at Microwave Frequencies"; Kawashima et al.; Journal of American Ceramic Society; vol. 66, No. 6, Apr., 1984.

Primary Examiner—Mark L. Bell
Assistant Examiner—Deborah Jones
Attorney, Agent, or Firm—Spensley Horn Jubas & Lubitz

[57] ABSTRACT

In a dielectric ceramic composed of a La$_2$O$_3$-CaO-TiO$_2$-MgO type or a BaO-Nd$_2$O$_3$-TiO$_2$ type, the oxygen vacancy concentration of the ceramic is controlled below $7 \times 10^{18}$/cm$^3$ by, for example, annealing the mixture after firing, or heat-treating the mixture after firing. The Q value of the dielectric ceramic can be markedly increased. In addition, ceramics having stable properties can be produced. Thus, the dielectric ceramics can fully cope with high frequencies and large electrification.

8 Claims, 2 Drawing Sheets

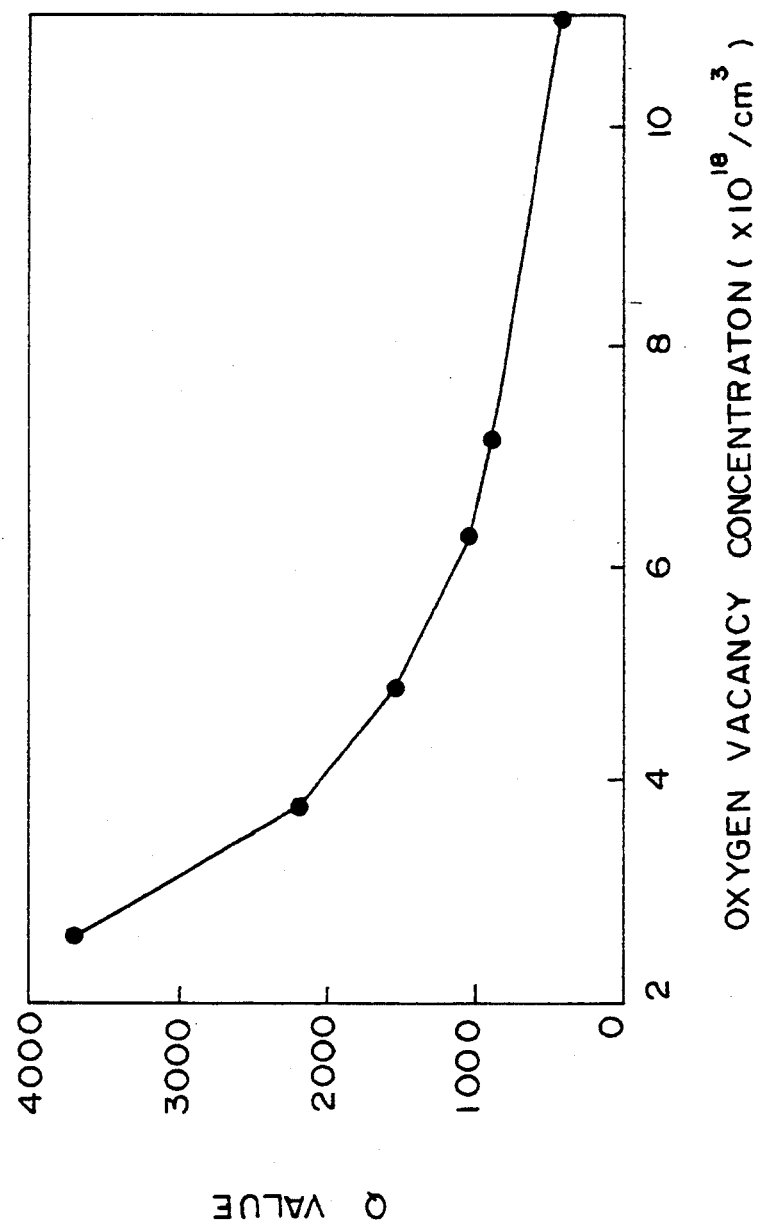

DIELECTRIC CERAMIC FOR MICROWAVES

This is a continuation of application Ser. No. 07/961,125 filed on Oct. 14, 1992, now abandoned.

BACKGROUND OF THE INVENTION

1. Field of the Invention

This invention relates to a dielectric ceramic for microwaves having a high Q value suitable as a resonator and a circuit substrate material in a micro wave area.

2. Description of the Related Art

In recent years, dielectric ceramic have been widely used in a microwave area with the commercialization of automobile telephones, cordless telephones, personal wireless machines, and satellite broadcast receivers. Such dielectric ceramics for microwaves are used mainly in resonators. The characteristics required by the dielectric ceramics are the following three. (1) In the dielectric, the wavelength is shortened to $1/\epsilon r^{\frac{1}{2}}$ ($\epsilon r$: specific permittivity). Accordingly, the specific permittivity is large for the requirement of a smaller size. (2) At high frequencies, the dielectric loss is small, and therefore, the Q value is high. (3) Resonant frequencies vary little to the temperature; namely, the temperature dependence of the specific permittivity is small and stable.

Heretofore, the known dielectric ceramics of this type include complex oxide dielectric materials such as $BaO-TiO_2$ type materials, $BaO-REO-TiO_2$ (wherein REO is a rare earth element oxide) type materials, $MgTiO_3-CaTiO_3$ type materials and complex perovskite type materials.

Furthermore, among the aforementioned three requirements to the dielectric ceramics for microwaves, they are recently required to have a high Q value with higher frequencies of the used frequencies and larger electrification.

As shown in K. Wakino et al., J. Am. Ceram. Soc., 67,278 (1984), impurities in the crystal grains or impurity phases are eliminated. Attempts have been made to arrange cations regularly in complex peroviskite type materials as shown in S. Kawashima et al., J. Am. Ceram. Soc., 66,421 (1983).

SUMMARY OF THE INVENTION

However, in the method of eliminating the impurities, the starting material should be highly purified, or the production step should be elaborately controlled and these may become the factors which lead to a high cost of production. The improvement by regular arrangement of cations can be applied only to a complex perovskite type material having a regularly arranged crystal structure which is energetically stabler than an irregular arrangement of a crystal structure, and cannot be applied to other general materials.

Furthermore, even when various conditions are prescribed in any of the above methods, the Q value has poor reproducibility and therefore it is difficult to control the Q value. Thus, at the time of mass production, ceramics having stable characteristics are difficult to produce.

Accordingly, it is an object of this invention to produce a dielectric ceramic for microwaves which has a high Q value that can be controlled easily.

The present inventors repeated investigations on the above problems, and found that the Q value varies by the oxygen vacancy in the ceramic, and depends greatly upon its concentration. When the desirable oxygen vacancy concentration is investigated, we have found that by adjusting the oxygen vacancy concentration in the ceramic is prescribed at not more than $7 \times 10^{18}/cm^3$, an excellent Q value can be realized.

BRIEF DESCRIPTION OF THE DRAWINGS

FIG. 2 is a view showing the relation between the oxygen vacancy concentration and the Q value in the dielectric ceramics having a $BaO-Nd_2O_3-TiO_2$ type composition.

DETAILED DESCRIPTION OF THE INVENTION

Figure 1:
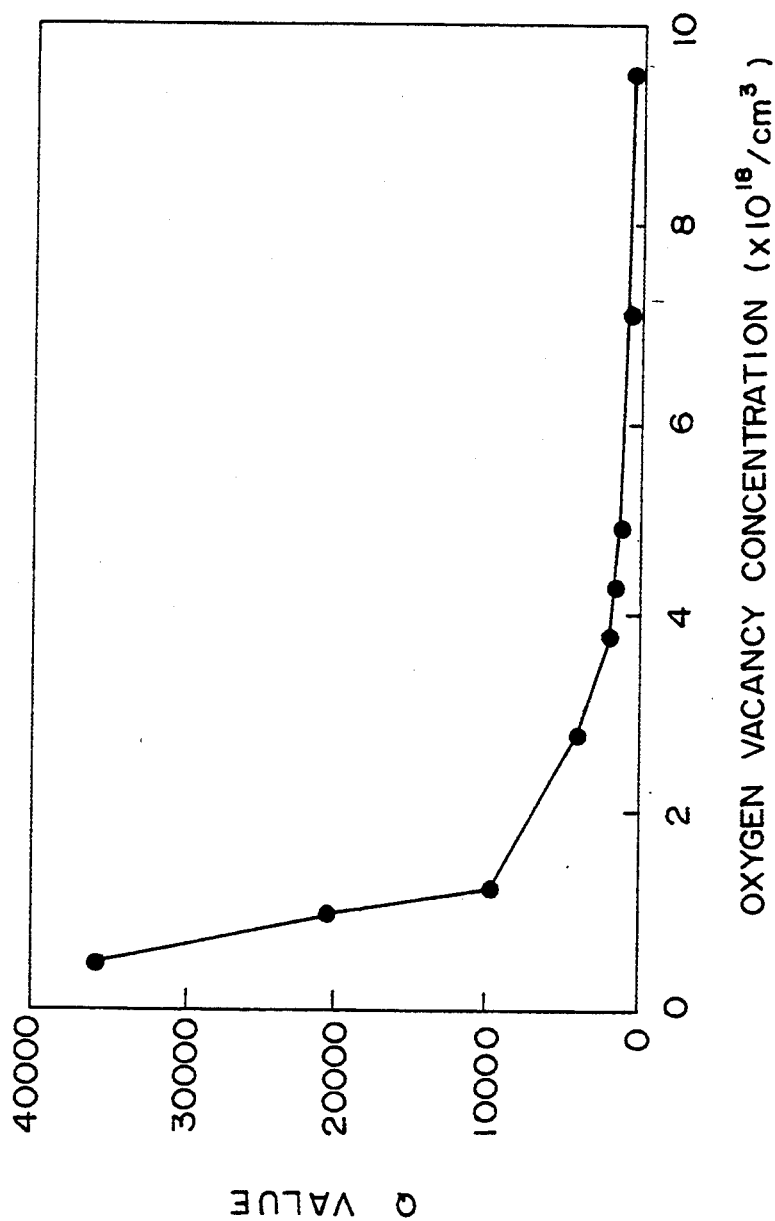
FIG. 1 is a view showing the relation between the oxygen vacancy concentration and the Q value in the dielectric ceramics having a $La_2O_3-CaO-TiO_2-MgO$ type composition.

The present invention will be described in detail.

Dielectric properties in a microwave area are realized mainly by ion polarization. The complex specific permittivity of a three-dimensional crystalline lattice by ion polarization can be considered for simplicity as a lattice vibration model of one dimension having two atoms. The permittivity $\epsilon'(\omega)$ is given by the following formula.

$$\epsilon'(\omega) - \epsilon(\text{infinite}) = \frac{\omega t^2 ((\theta) - \epsilon(\text{infinite}))}{\omega t^2 - \omega^2 - i\gamma\omega}$$

In the formula, $\omega t$ is a frequency in an optical mode of a lateral wave of the lattice vibration, $\gamma$ is a decay constant, $\epsilon(\text{infinite})$ is a specific permittivity by electron polarization, and $\epsilon(0)$ is a specific permittivity at a lower frequency than the microwaves. In the microwave area, $\omega t >> \omega$, and therefore the formula is approximated to the following formulae.

$$\epsilon'(\omega) - \epsilon(\text{infinite}) = \epsilon(0) - \epsilon(\text{infinite})$$

$$\tan \delta = 1/Q = \gamma\omega/\omega t^2$$

Accordingly, to increase the Q value, $\gamma$ which decays the lattice vibration may be decreased. Here, the oxygen vacancy in the crystal lattice is considered to increase $\gamma$ which decays the lattice vibration. Thus, if the concentration of oxygen vacancy is made smaller, $\gamma$ becomes smaller, and a high Q value may be obtained.

From such viewpoint, if the concentration of oxygen vacancy in the ceramic is controlled to not more than $7 \times 10^{18}/cm^3$, especially not more than $4 \times 10^{18}/cm^3$, a high Q value can be obtained. The oxygen vacancy concentration in this invention can be determined by a thermal gravimetry method. For example, a ceramic fired at a temperature $T_1$ (in the atmosphere) is heat-treated at a lower temperature $T_2$ than the firing temperature $T_1$, and oxygen is supplied so that a thermal equilibrium at a lower heat-treatment temperature $T_2$ is reached. From a weight change per unit volume of the ceramic before and after the heat-treatment, the variation amount $\Delta[V_{o''}]$ of the oxygen vacancy concentration was determined. Then, from the equivalent constant of the oxygen vacancy forming reaction, the ratio of the oxygen vacancy concentration before and after the heat-treatment, $[V_{o''}]_1/[V_{o''}]_2$, is determined. From this ratio $[V_{o''}]_1/[V_{o''}]_2$ and the $\Delta[V_{o''}]$, the oxygen vacancy concentrations at the respective temperatures may be determined $[V_{o''}]_1$ and $[V_{o''}]_2$. Specifically, $[V_{o''}]_1$ and $[V_{o''}]_2$ may be determined from the following formulae.

$$\frac{[V_{o''}]_1}{[V_{o''}]_2} = \exp\left\{\frac{\Delta H_{vo}}{3k}(1/T_2 - 1/T_1)\right\}$$

$$\Delta[V_{o''}] = [V_{o''}]_1 - [V_{o''}]_2$$

In the formulae, k is a Boltzmann's constant, and $\Delta H_{vo}$ is the formation enthalpy of oxygen vacancy which can be determined by experimentally solving the equilibrium reaction of lattice defect formation. Furthermore, the oxygen vacancy concentration in a condition which does not reach a thermal equilibrium in the heat treatment can be determined by measuring $\Delta[V_{o''}]$ and from the above-mentioned $[V_{o''}]_1$.

The above information regarding the Q value of the invention can be applied to all compositions known as metal complex compounds, and to satisfy other properties such as a high permittivity as a dielectric ceramic for microwaves, a metal complex oxide containing Ti as a metal component, for example, is desirable. A preferred metal complex oxide is one containing titanium, a rare earth element and an element of Group IIa of the periodic table. Especially, a metal complex oxide containing 15 to 80 atomic ratio % of titanium, 5 to 75 atomic ratio % of a rare earth element, and 10 to 80 atomic ratio % of an element of Group IIa of the periodic table based on the three component atoms is preferred. More specifically, a dielectric ceramic of the La-Ti-Mg-Ca-O type having a composition comprising 15–60:15–45:7.5–45:0–35 in an atomic ratio of La:-Ti:Mg:Ca shown in Japanese Laid-Open Patent Publication No. 128411/1986, and a composition mainly comprising Ba-Ti-RE (rare earth element)-O type and having Ba:Ti:RE in an atomic ratio of 10–20:50–80:-10–40 and further containing about 5 to 30% by weight of Bi or Pb as an oxide as shown in Japanese Laid-Open Patent Publication No. 100058/1988 are preferably used.

Now, the method of preparing the dielectric ceramic for microwaves in this invention will be described. According to the aforesaid information obtained by the present invention, the concentration of oxygen vacancy in the finally obtained dielectric ceramic is greatly affected by the oxygen partial pressure at the time of firing or the cooling velocity after firing.

The specific method of preparation will be described. First, the metal oxides forming the dielectric ceramic are weighed and mixed in predetermined proportions, and then provisionally calcined in an atmosphere such as air. The powder after provisional calcining is crushed to a size of not more than 1.5 μm, granulated, molded by a known press molding or extrusion molding, and then fired.

According to the present invention, the firing temperature differs according to the composition. It is present at a sufficiently sinterable firing temperature. For example, in a La-Ti-Mg-Ca-O type, the preferred temperature is 1500° to 1700° C. In a Ba-RE-Ti-O type, a temperature of 1250° to 1400° C. is preferred.

This firing is usually carried out in an dir, and then cooled. By such a firing method, the concentration of oxygen vacancy is about $9-11 \times 10^{18}/cm^3$. In contrast to this, (1) firing is carried out in an oxygen atmosphere having a partial oxygen pressure exceeding 0.2 atmospheres, especially in an oxygen atmosphere having at least 0.5 atmospheres. (2) At the time of cooling after firing, the material is cooled to 500° C. at 5°–200° C./hr, especially at 5° to 50° C./hr. (3) During cooling after firing, the material is temporarily held at 500° to 1200° C. (4) After usual firing, the material is heat-treated in an atmosphere at 500° to 1200° C. Firing or treatment should be desirably carried out by performing either of these processes or together. Namely, this means that for the oxygen vacancy in the ceramic, oxygen is sufficiently fed in a sufficient oxygen-containing atmosphere. The treatment time of each of the above treatments varies the oxygen vacancy concentration of the ceramic. Desirably, the above treatment is preferably carried out until the oxygen vacancy reaches a thermal equilibrium.

The present invention is useful for obtaining electronic component parts for microwaves. Specifically, the present invention is especially useful for a frequency band of 0.1 to 10 GHz and used as resonators and substrate materials to be applied to a microwave band.

According to this invention, the oxygen vacancy concentration greatly affects the Q value of the ceramic in the dielectric ceramic for microwaves composed of metal complex oxides, and this tendency is demonstrated by FIGS. 1 and 2 showing the relation between the Q value and the oxygen vacancy concentration. According to FIGS. 1 and 2, it is understood that as the oxygen vacancy concentration becomes small, the Q value tends to become large. Especially, according to FIGS. 1 and 2, a Q value of at least 1000 is achieved at an oxygen vacancy concentration of not more than $7 \times 10^{18}/cm^3$, and a Q value of at least 2000 is achieved at an oxygen vacancy concentration of not more than $4 \times 10^{18}/cm^3$.

Furthermore, according to this invention, the reproducibility of the Q value by controling the oxygen vacancy concentration is excellent. Hence, the Q value of the ceramic can be controlled only by the controlling of the oxygen vacancy concentration, and therefore, it is easier to control than in the past.

EXAMPLES

Example 1

A $La_2O_3$ powder, a $CaCO_3$ powder, a $TiO_2$ powder and a $MgCO_3$ powder having a purity of at least 99.5% were used as a starting material. They were weighed and mixed so that their proportions became 45.38% by weight of $La_2O_3$, 15.62% by weight of CaO, 33.38% by weight of $TiO_2$, and 5.62% by weight of MgO. Pure water was added, and they were wet-mixed for 20 hours.

The mixture was dried, and calcined at 1200° C. for 2 hours. Furthermore, about 1% by weight of a binder was added, and the particles of the powder were adjusted. The resulting mixture was molded under about 1000 kg/$cm^2$ and fired at 1500° to 1700° C. in an air for 2 hours.

The cylindrical portion of the resulting ceramic was plainly polished, ultrasonically washed in acetone, and dried at 150° C. for 1 hour. The weight of the ceramic was measured by a microbalance. The specific permittivity and Q value at a frequency of 4 GHz were measured by a cylindrical resonant method (Coleman and Hakki method). Thereafter, in the air, the ceramic was heat-treated by varying the holding time at 1000° C. At every holding time, the weight, the specific permittivity and Q value were measured. When there was no weight change in the ceramic even if the holding time was taken for a long time, namely when a thermal equilibrium condition was reached the amount of change $\Delta[V_{o''}]$ of the oxygen vacancy concentration was determined from the balance of the weight of the ceramic and the weight before the heat-treatment, and the oxygen vacancy concentration $[V_{o''}]_2$ was calculated for each heat-treatment time. These oxygen vacancy concentrations, the Q values and the specific permittivities are shown in Table 1.

TABLE 1

| Sample No. | Treatment temperature (°C.) | Time (hr) | Q value | Oxygen vacancy concentration (number/cm$^3$) | Specific permittivity ($\epsilon r$) |
|---|---|---|---|---|---|
| 1 | 1000 | 60 | 35980 | 0.45 × 10$^{18}$ | 45.55 |
| 2 | 1000 | 40 | 20620 | 0.94 × 10$^{18}$ | 45.55 |
| 3 | 1000 | 24 | 9840 | 1.3 × 10$^{18}$ | 45.61 |
| 4 | 1000 | 14 | 4060 | 2.8 × 10$^{18}$ | 45.77 |
| 5 | 1000 | 8 | 2010 | 3.8 × 10$^{18}$ | 45.59 |
| 6 | 1000 | 6 | 1690 | 4.3 × 10$^{18}$ | 45.62 |
| 7 | 1000 | 4 | 1340 | 4.9 × 10$^{18}$ | 45.61 |
| *8 | 1000 | 2 | 830 | 7.1 × 10$^{18}$ | 45.61 |
| *9 | no treatment | 0 | 540 | 9.5 × 10$^{18}$ | 45.62 |

*showing the samples outside the present invention

The results of Table 1 were plotted in FIG. 1. According to Table 1 and FIG. 1, the specific permittivities were equivalent at 45.55 to 45.77. Samples 8 and 9 whose oxygen vacancy concentrations exceeded 7×10$^{18}$/cm$^3$ had a low Q value. In contrast, the samples within the range of this invention had a high Q value. Especially, a Q value of at least 2000 was achieved when the oxygen vacancy concentration was not more than 4×10$^{18}$/cm$^3$.

Example 2

A BaCO$_3$ powder, a Nd$_2$O$_3$ powder, a TiO$_2$ powder and Bi$_2$O$_3$ powder having a high purity were used as a starting material, and they were weighed so that their proportions were 16.21% by weight of BaO, 30.23% by weight of Nd$_2$O$_3$, 37.82% by weight of TiO$_2$, and 15.74% by weight of Bi$_2$O$_3$. After weighing, pure water was added and they were wet-mixed for 20 hours. The mixture was dried, and calcined at 1200° C. for 2 hours. Furthermore, about 1% by weight of a binder was added, and the particles of the mixture were adjusted. The resulting powder was molded under a pressure of about 1000 kg/cm$^2$, and fired in the air at 1200° to 1400° C. for 2 hours.

The cylindrical portion of the resulting ceramic was polished plainly, washed with ultrasonically in acetone, and dried at 150° C. for 1 hour. Then, the weight of the ceramic was measured by a microbalance, and the specific permittivity and Q value at a frequency of 2 GHz were measured by a cylindrical resonant method. Thereafter, the mixture was heat-treated in the air at 800° C. by varying the holding time. By the same method as in Example 1, the oxygen vacancy concentration, the Q value and the specific permittivity were measured. The results are shown in Table 2.

TABLE 2

| Sample No. | Treatment temperature (°C.) | Time (hr) | Q value | Oxygen vacancy concentration (number/cm$^3$) | Specific permittivity ($\epsilon r$) |
|---|---|---|---|---|---|
| 10 | 800 | 60 | 3730 | 2.6 × 10$^{18}$ | 112.1 |
| 11 | 800 | 32 | 2200 | 3.8 × 10$^{18}$ | 112.5 |
| 12 | 800 | 25 | 1550 | 4.9 × 10$^{18}$ | 112.8 |
| 13 | 800 | 20 | 1080 | 6.3 × 10$^{18}$ | 112.6 |
| *14 | 800 | 15 | 910 | 7.2 × 10$^{18}$ | 112.9 |
| *15 | no treatment | 0 | 480 | 11.4 × 10$^{18}$ | 112.8 |

*showing the samples outside the present invention

From the results of Table 2, the relation between the oxygen vacancy concentration and the Q value is shown in FIG. 2.

According to Table 2 and FIG. 2, the specific permittivities as in Example 1 showed the same values 112.1 to 112.9. But the Q value varied depending upon the heat-treatment conditions. Especially, samples 14 and 15 in which the oxygen vacancy concentrations exceeded 7×10$^{18}$/cm$^3$ showed a decline in Q value. in contrast, samples within the present invention all showed a high Q value, and especially a Q value of at least 2000 was obtained at an oxygen vacancy concentration of 4×10$^{18}$/cm$^3$.

As mentioned above, the Q value of the dielectric ceramic of this invention for microwaves can be increased by controlling the oxygen vacancy concentration of the ceramic below a certain specific range. Furthermore, since the oxygen vacancy concentrations and the Q values are in a high correlation, the Q value can be controlled by the oxygen vacancy concentration. Thus, ceramics having a high Q value can be stably produced.

This makes it possible to sufficiently cope with high frequencies of the used frequencies and large electrification.

What is claimed is:

1. A dielectric ceramic composition for microwaves comprising metal complex oxides having an oxygen vacancy concentration of not more than 7×10$^{18}$/cm$^3$ wherein the metal complex oxides comprise Ti or Ti ions as a metal component.

2. The composition of claim 1 wherein the metal complex oxides comprise La, Ti, Mg and Ca as metal components thereof.

3. The composition of claim 1 wherein the metal complex oxides comprise Ba, Ti and a rare earth element as metal components thereof.

4. The composition of claim 3 wherein the atomic ratio of Ba:Ti:rare earth element is in the range of 10–20:50–80:10–40.

5. The composition of claim 1 wherein the metal complex oxides comprise titanium, a rare earth element, and a Group IIa element of the periodic table.

6. The composition of claim 5 wherein the metal complex oxides comprise at least 15 to 80 atomic ratio % of titanium, 5 to 75 atomic ratio % of a rare earth element, and 10 to 80 atomic ratio % of a Group IIa element of the periodic table.

7. A dielectric ceramic composition for microwaves comprising metal complex oxides having an oxygen vacancy concentration of not more than 7×10$^{18}$/cm$^3$ wherein the metal complex oxides comprises La, Ti, Mg and Ca, and wherein the atomic ratio of La:Ti:Mg:Ca is in the range of 15–60:15–45:7.5–45:0–35.

8. The composition of claim 1 wherein the complex metal oxides further comprise a metal component selected from Bi and Pb, the metal component being 5% to 30% by weight based on the oxides.

* * * * *